United States Patent
Roorda et al.

(10) Patent No.: US 7,200,331 B2
(45) Date of Patent: Apr. 3, 2007

(54) WAVELENGTH ROUTING ON AN OPTICAL METRO NETWORK SUBTENDED OFF AN AGILE CORE OPTICAL NETWORK

(75) Inventors: Peter David Roorda, Ottawa (CA); Alan Glen Solheim, Stittsville (CA)

(73) Assignee: Lucent Technologies Inc., Murray Hill, NJ (US)

( * ) Notice: Subject to any disclaimer, the term of this patent is extended or adjusted under 35 U.S.C. 154(b) by 690 days.

(21) Appl. No.: 10/195,247

(22) Filed: Jul. 15, 2002

(65) Prior Publication Data
US 2004/0208558 A1 Oct. 21, 2004

(51) Int. Cl.
*H04B 10/20* (2006.01)
(52) U.S. Cl. .................. 398/58; 398/59; 398/79

(58) Field of Classification Search .............. 398/58, 398/59, 79
See application file for complete search history.

(56) References Cited

U.S. PATENT DOCUMENTS

| | | | |
|---|---|---|---|
| 6,895,184 B2 * | 5/2005 | Way ........................... | 398/59 |
| 2002/0080445 A1 * | 6/2002 | Falkenstein et al. ......... | 359/127 |
| 2002/0191250 A1 * | 12/2002 | Graves et al. ............. | 359/128 |
| 2003/0048501 A1 * | 3/2003 | Guess et al. ................ | 359/118 |

* cited by examiner

*Primary Examiner*—David C. Payne

(57) ABSTRACT

The is directed to extending wavelength routing on a metro network subtended off an optical agile network. Flexibility on the subtended metro network is obtained by either tuning the head-end transmitter on a metro wavelength that is the operating wavelength of the route to a specified tail-end node (tunable source, fixed wavelength-route dependency) or/and tuning a specified route to the metro wavelength (fixed source, tunable wavelength-route dependency). The routes may be tuned at one or both ends.

29 Claims, 8 Drawing Sheets

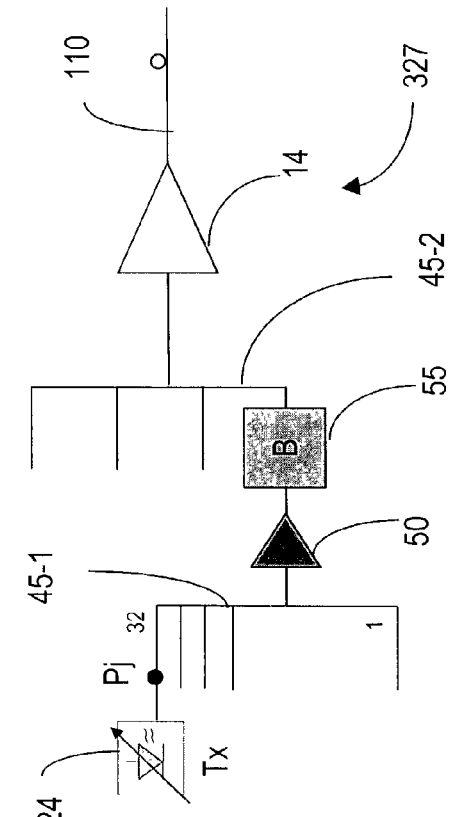
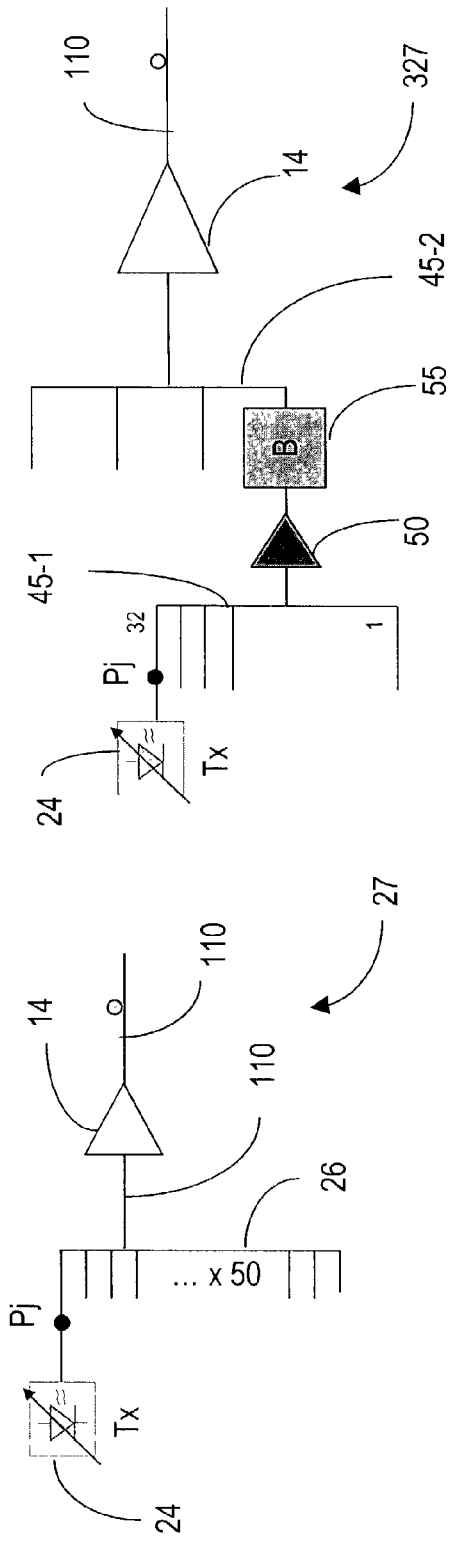
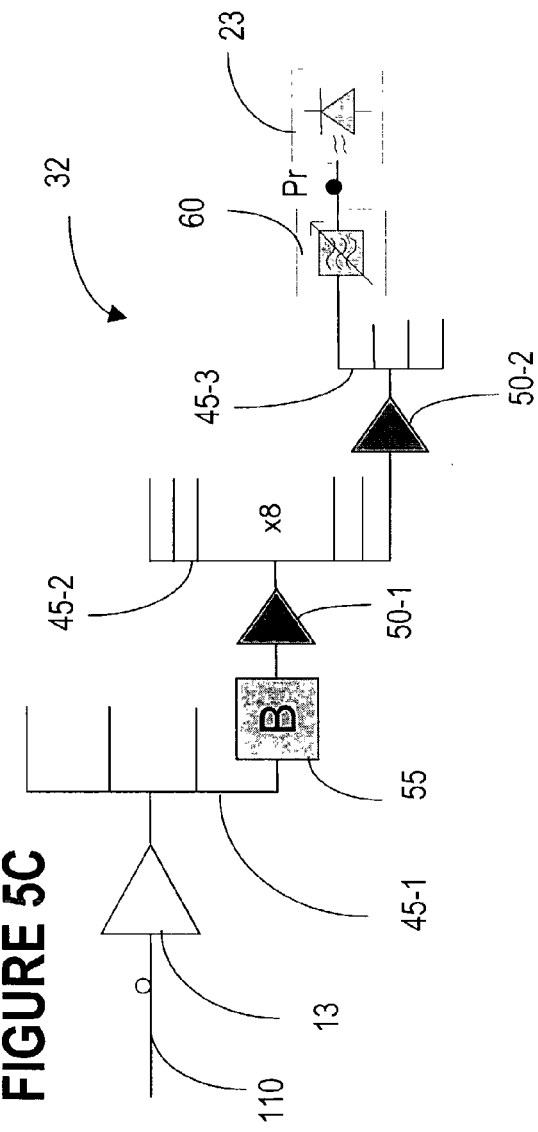

WAVELENGTH ROUTING ON AN OPTICAL METRO NETWORK SUBTENDED OFF AN AGILE CORE OPTICAL NETWORK

RELATED PATENT APPLICATIONS

U.S. patent application Ser. No. 09/876,391, "Architecture For A Photonic Transport Network", (Roorda et al.), filed Jun. 7, 2001.

U.S. patent application Ser. No. 09/946,576 "Reconfigurable access to a WDM network" (Pham et al), filed Sep. 5, 2001.

U.S. patent application Ser. No. 10/002,773, "Architecture For An OADM Node Of A WDM Optical Network" (Roorda et al.), filed Nov. 2, 2002.

FIELD OF THE INVENTION

The invention resides in the field of optical telecommunications networks, and is directed in particular to extending wavelength routing on a metro network subtended off an agile core optical network.

BACKGROUND OF THE INVENTION

The current networks are based on a point-to-point architecture, where all channels are converted to an electrical format (optical-to-electrical-to-optical or OEO) for traffic switching, aggregation and regeneration.

With the evolution of the optical devices, it is now possible to extend the optical reach and to provide the network nodes with optical passthrough. For example, U.S. Pat. No. 5,751,454 (MacDonald et al.) discloses OADM (optical add/drop multiplexer) node configurations with wavelength bypass in optical format. Such a node is equipped with an optical demultiplexer that separates the WDM signal (multi-channel signal) on the input line into drop channels and passthrough channels; the drop channels are routed to a respective local user, and the passthrough channels are routed to the output of the node. At the output side of a node, an optical multiplexer combines the passthrough channels with the locally generated channels (add channels) into the output line.

Also, tunable optical devices are now coming onto the market. Thus, for example Nortel Networks announced general availability for a widely tunable laser ML-20 for use in optical transmitters (Tx). Tunable filters that select a certain wavelength can be used at the receiving side, so that a broadband receiver (Rx) using such filters may detect any channel. JDS Uniphase Corporation manufactures a blocker, which can block a set of channels (one or more channels that need not be consecutive) than can be dynamically reconfigured.

A new generation of all optical networks is emerging, driven by customer demand for individualized classes of service, with the corresponding revenue differentiation. This new generation of networks will enable the customers with the ability to automatically establish end-to-end connections at a push of a button. This means that the nodes of the network need to be able to switch the traffic in optical domain, while automatically regenerating the signal only when necessary. This approach dramatically reduces the node complexity, and consequently the network cost.

Optical networks may be classified according to the area they serve; relevant to this invention are the metro networks and long-haul (or core, or transport) networks. U.S. Pat. No. 6,084,694 (Milton et al.) illustrates examples of metro rings with optical passthrough, where any two nodes around the ring may be connected using pre-selected bands of wavelengths. Nonetheless, the wavelength allocation to each connection is fixed for an entire band of channels, which reduces the flexibility of operation.

US patent application identified above as U.S. patent application Ser. No. 09/876,391 describes an agile core (transport, long-haul) optical network that uses optical switching and a scalable and flexible architecture for end-to-end (rather than point-to-point) routing/switching of channels. This patent application is incorporated herein by reference.

Typically, metro network aggregate capacities are lower than those in long haul networks. Also, connection capacities are lower; metro optical networks operate at 2.5 Gb/s rates or lower, while long-haul networks use 10 Gb/s per wavelength. Thus, to interconnect traffic from metro into long-haul networks, a multiplexing or aggregation function must be fulfilled to map finer granularity metro connections into higher rate long-haul connections. The aggregation may be circuit-based TDM (time division multiplexing) or packet-based aggregation. Ideally, the interconnection must enable also switching of the metro channels into the correct higher rate long-haul channel. These aggregation and switching functions are typically achieved with an electrical switch fabric that interconnects long-haul and metro transponders There is an opportunity to extend the agility of a agile core network into a metro network, to provide wavelength routing capability right out to the customer premise. This could be achieved by enabling the nodes (edges) of the metro network with full tunability. However, this solution may be currently cost prohibitive.

SUMMARY OF THE INVENTION

This invention addresses this hub site aggregation and switching functions by using metro network wavelength tunability to flexibly connect metro connections to the electrical traffic aggregation devices, thereby eliminating expensive electrical switches.

It is an object of the invention to provide wavelength routing in a metro network subtended off a wavelength switched (agile) core network.

According to one aspect of the invention, a flexible metro connection extends a flexible core connection over a metro network subtended off an agile core network. The metro connection comprises an optical source terminal operating at a source wavelength for transmitting a user signal over a metro channel; a plurality of wavelength-dependent routes operating at a path wavelength, a route for directing the metro channel between an input port connected to the optical source and an output port connected to an associated optical destination terminal; and means for assigning a metro wavelength to the metro channel and routing the metro channel to a specified destination terminal based on the metro wavelength.

The invention is also directed to a method for extending an agile connection into a metro network subtended off a core network, comprising: generating, at a head-end transmitter, a metro channel carrying a user signal; connecting the head-end transmitter with a plurality of tail-end receivers along a respective plurality of wavelength-dependent routes provided over the metro network; and selecting a route between the head-end transmitter and a specified tail-end receiver and tuning the head-end transmitter to a metro wavelength corresponding to the wavelength of the route.

According to another aspect, the invention provides a method for extending an agile connection over a metro network subtended off an agile core network, comprising: generating, at a head-end transmitter operating at a source wavelength, a metro channel for carrying a user signal; providing a plurality of wavelength dependent routes over the metro network, a route for directing the metro channel between an input port connected to the head-end transmitter and an output port connected to an associated tail-end receiver over a path wavelength; and assigning a metro wavelength to the metro channel and routing the metro channel to a specified tail-end receiver based on the wavelength.

Still further, the invention provides a flexible metro connection for routing a user signal on a metro network between a hub node connecting the metro network to an agile core network and an edge node, comprising: a hub node for transferring the user signal between a metro channel of a first wavelength and a core channel of a second wavelength; an edge node for inserting/extracting the user signal into/from the metro channel; and a controller for tuning one of the hub node, edge node, and both the hub node and edge node to operate at the first wavelength.

One of the most important advantages of the invention is that it inherently provides aggregation and switching between metro and long-haul network traffic and eliminates the switch at the hub site.

BRIEF DESCRIPTION OF THE DRAWINGS

The foregoing and other objects, features and advantages of the invention will be apparent from the following more particular description of the preferred embodiments, as illustrated in the appended drawings, where:

FIGS. 5A–5C show examples of port-wavelength tunability at the hub node; and

DETAILED DESCRIPTION OF THE PREFERRED EMBODIMENTS

Figure 1:
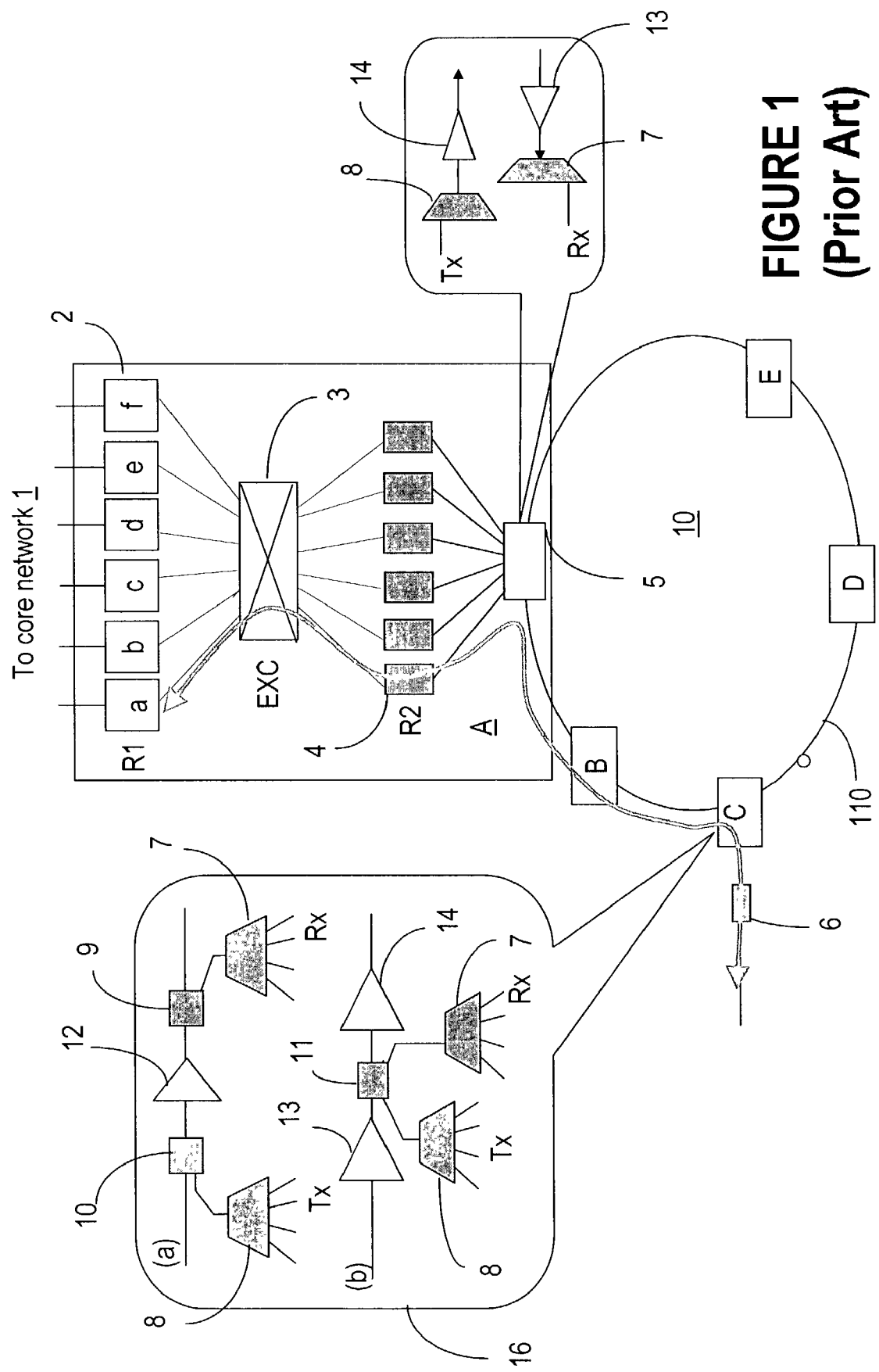
FIG. 1 shows schematically how a metro ring network is connected conventionally to a core network.

FIG. 1 shows the conventional configuration of a metro ring network 10 subtended off a dense WDM (DWDM) core network 1. FIG. 1 shows core transponders 2 that perform O/E (optical-to-electrical) or E/O conversion of the core (high-speed) channels carrying traffic on network 1. Transponders 2 could be for example 10 Gb/s transponders; they are also called long reach (LR) transponders. Metro transponders 4 terminate the metro (lower speed) channels carrying traffic on the metro network 10. Transponders 4 could be for example 2.5 Gb/s transponders; they are also called short reach (SR) transponders. In the general case transponders 2 operate at rate R1 and transponders 4 operate at rate R2. For example, in typical networks deployed today, the ratio between the core and metro rates is R1/R2=4.

Metro network 10 includes nodes A to E in this example, where node A, which connects metro network 10 with core network 1 is called a hub node and nodes B to E are edge nodes. The edge nodes are also provided with transponders 6 shown for node C, operating at rate R2 for E/O and O/E converting the metro channels.

A cross-connect EXC 3 switches and grooms the core traffic into metro traffic.

At node A, the channels received from all transmitters of terminals 4 are multiplexed into a metro WDM signal, as shown by multiplexer 8. The term downstream is used in this specification for the direction of traffic from the core network 1 to the metro network 10. The metro WDM signal is transmitted on network 10, and each edge node extracts the channels that are addressed to it. In the upstream direction, namely from the metro network 10 to core network 1, the WDM signal received at node A is demultiplexed as shown by demultiplexer 7, and detected by a respective receiver of transponder 4. As also shown in FIG. 1, the multiplexer 8 and demultiplexer 7 are generally provided with a preamplifier 13 and postamplifier 14, respectively.

FIG. 1 shows two variants a) and b) of an edge node for node C. The edge nodes are typically provided with a respective demultiplexer 7 for separating the drop channels from the metro WDM signal and routing each drop channel to a respective receiver of a transponder 6. A node multiplexer 8 combines the add channels received from a respective transmitter into the metro WDM signal. Splitters 9, combiners 10, splitters/combiners 11 and optical amplifiers 12, 13, 14 may be connected in the path of the WDM signal as shown. Other edge nodes architectures are also possible. Configurations a) and b), and other such known multiplexer/demultiplexer configuration are generally denoted with numeral 16. Note that for very short distances and/or where high power lasers and/or high sensitivity receivers are used, amplifiers may not be required.

Figure 2A:
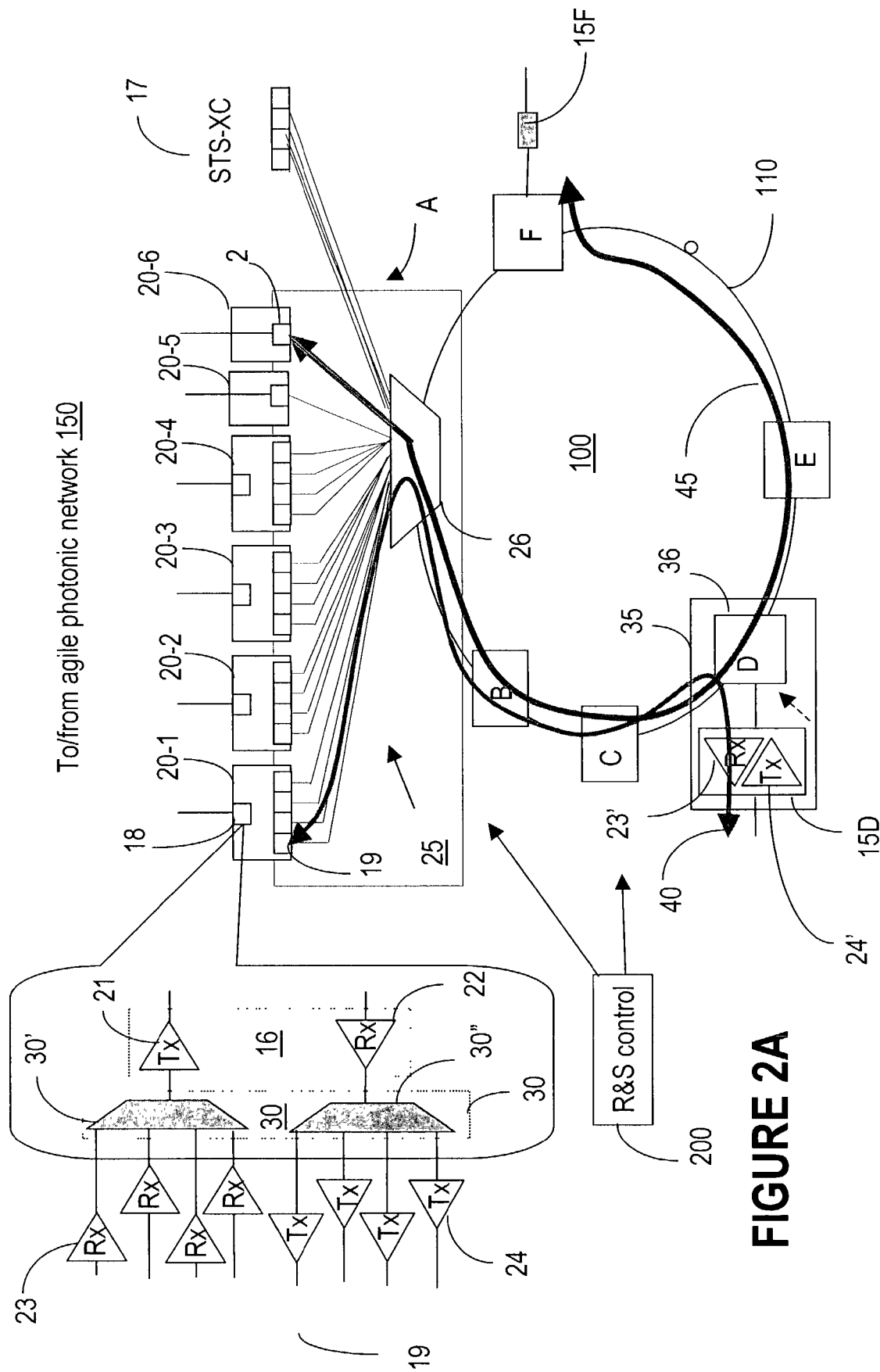
FIGS. 2A to 2C show aggregating an agile optical core network with various metro network configurations. The metro network is a ring network in FIG. 2A, a linear network in FIG. 2B and a point-to-point network in FIG. 2C.

FIG. 2A shows a ring metro 100 subtended by an agile photonic network 150. The agile network is not shown, only the core transponders at the hub node A are shown at 19. The metro network 100 is a ring, which connects the hub node A with edge nodes B-F over fiber 110.

The term "flexible" or "agile" is used in this specification in conjunction to a network, a connection over an agile network or a network device. It refers to the ability of a network to allocate to a certain connection any wavelength that is available in the respective network, and that is unused by other connections. It also refers to the ability of a network device, such as an OADM (optical add/drop multiplexer) or a mux/demux (multiplexer/demultiplexer) to route a connection from an input port to an output port according to the wavelength of the optical channel assigned to the respective connection. In this way, the port-wavelength allocation in a flexible OADM or a flexible mux/demux can be changed, or "tuned".

The term "flexible metro connection" refers here to the metro section of an inter-network connection, as shown at 40 and 45 in FIG. 2A. Such a connection is established between a metro optical terminal (transponder) at an edge node, such as transponder 15D at node D on metro network 100 and a core optical terminal, such as transponders 20-1 and 20-6 at the hub node A. The reminder of the inter-network connection, i.e. the section along the agile core network 150 between the hub node A and a core network node is not illustrated. It is to be noted that the above-identified patent application Ser. No. 09/876,391 describes how connections can be established between any node of agile core network 150, under control of an intelligent network operating system and a smart line system. The routing and switching functionality of these entities are illustrated on FIG. 2A by the routing and switching control unit 200. Controller 200 is responsible for selecting a core wavelength for the core section of the connection, selection a metro wavelength for the metro section of the connection and mapping the core wavelength to the metro wavelength. As discussed in connection with FIG. 1, traffic exchange between the core and metro networks requires switching, so that ends of the metro connection route the user signal at a certain core transponder correctly to/from the correct destination/source edge node. Unit 200 is also responsible with tuning one or both ends of the metro connection to that metro wavelength.

The term "fixed" is used for devices that operate on a predetermined, unchangeable wavelength. For example, a fixed transmitter is able to generate a carrier wavelength only. A mux/demux or OADM with a fixed port allocation must always be connected so as to receive the same wavelength on a certain port.

The term "colorless" refers to a port/device that is wavelength independent. For example, the ports of an optical combiner are colorless, in that the port/channel allocation is irrelevant.

The term "optical source" is used for the electrical-to-optical converters that are used to transmit a user signal over an optical channel. In general, the optical sources use lasers, but other devices that provide a similar functionality are encompasses by this term. The term "optical detector" is used for the optical-to-electrical converters used to extract the user signal carried by the optical channel. It can be any type of solid state photodetector such as a photodiode, PIN photodiode, avalanche photodiode (APD), or phototransistor. An APD or a phototransistor is preferred in some applications, as they provide gain (gain is beneficial because it increases the detector sensitivity). The optical detectors can detect generally on a broad band of channels.

As discussed in connection with FIG. 1, traffic exchange between the core and metro networks generally requires switching and it may also require rate conversion.

The design of the edge and hub nodes, together with wavelength tuning for destination assignment capabilities, result in elimination of the switch 3 shown in FIG. 1. It is to be noted that conferring flexibility to a connection can also be seen as providing a plurality of physical routes between a certain transmitter and a plurality of receivers. The routes are wavelength-dependent; if each route can be tuned to a allow a certain wavelength to pass, while blocking all other wavelengths, the metro channel generated by the transmitter can be routed to any receiver of interest, by tuning the transmitter to the wavelength of a route, or by tuning the route to a certain wavelength. The route tunability can be provided at one or both ends.

Nonetheless, rate adaptation may still be necessary if networks 150 and 100 operate at a different rate. FIG. 2A shows a connection 40 between terminal 20-1 on agile transport network 150 and edge node 35 on metro network 100, which implies rate conversion, and another connection between terminal 20-6 and edge node F, which does not require rate conversion. Rate conversion is performed in electrical format, as shown for terminals 20-1 to 20-4.

Terminals 20-1 to 20-4 are provided with core transponders 16, each comprising a core transmitter 21 and a core receiver 22, and with metro transponders 19, each comprising a metro transmitter 24 and a metro receiver 23. In the example of FIG. 2A, a multiplexer/demultiplexer device 30 comprises a 4:1 multiplexer 30' and a 1×4 demultiplexer 30" to accommodate for a 4:1 ratio between core network 150 and metro network 100. Thus, in the case that metro network carries OC-48 channels and network 150 carries OC-192 channels, the multiplexer 30' is connected between four metro receivers 23 (of the respective four metro transponders 19) and a core transmitter 21 (of core transponder 18). The multiplexer 30' combines four STS-48 into an STS-192, before electrical-to-optical conversion to an OC-192 for launching on the agile network 150. Demultiplexer 30" is connected between a core receiver 22 (of core transponder 18) and four metro transmitters 24 (of the respective four metro transponders 19). The demultiplexer 30" separates a STS-192 into four STS-48, before electrical-to-optical conversion into four respective OC-48 for launching on the metro network 100. Terminal 18 is referred to as "rate aggregation means" and includes the multiplexer/demultiplexer 30 and the respective core transponder 16, as shown in the insert.

In the case where the metro network carries OC-192 channels, the multiplexer/demultiplexer 30 is not necessary, as shown for terminals 20-5 and 20-6, which are equipped with LR-SR transponders only. Inter-network connection 45 is an example where aggregation/separation is not necessary. For the general case when the metro channels have a rate R1 and the core channels have a rate R2, the traffic aggregation factor is N+R2/R1.

The terminals of the metro connection, i.e. the equipment provided at the hub node and edge nodes, that is relevant to this invention are generically shown by reference numerals 25, and respectively 35. The arrow on terminal 25 and the dotted arrow on terminal 35 are intended to show that one, or both terminals are flexible, i.e. can be tuned to the wavelength of the other terminal under control of unit 200.

Terminal 25 comprises the metro transponder 19 and, in general, an optical mux/demux 26. Device 26 combines/separates the metro channel used by the agile metro connection 40 in this example, onto/from a metro WDM signal traveling in network 100 over line (fiber) 110.

Terminal 35 comprises the metro transponder 15 and, in general, an OADM (optical add/drop multiplexer) 36. Device 36 has an input port, an output port and one or more add/drop ports. This device routes the passthrough channels from the input port to the output port in optical format, and adds/drops the local traffic into/from the output/input port to a respective optical terminal. The transponders at the edge nodes are shown at 15A and 15F; such a transponder includes a receiver 23' and a transmitter 24'.

Figure 2C:
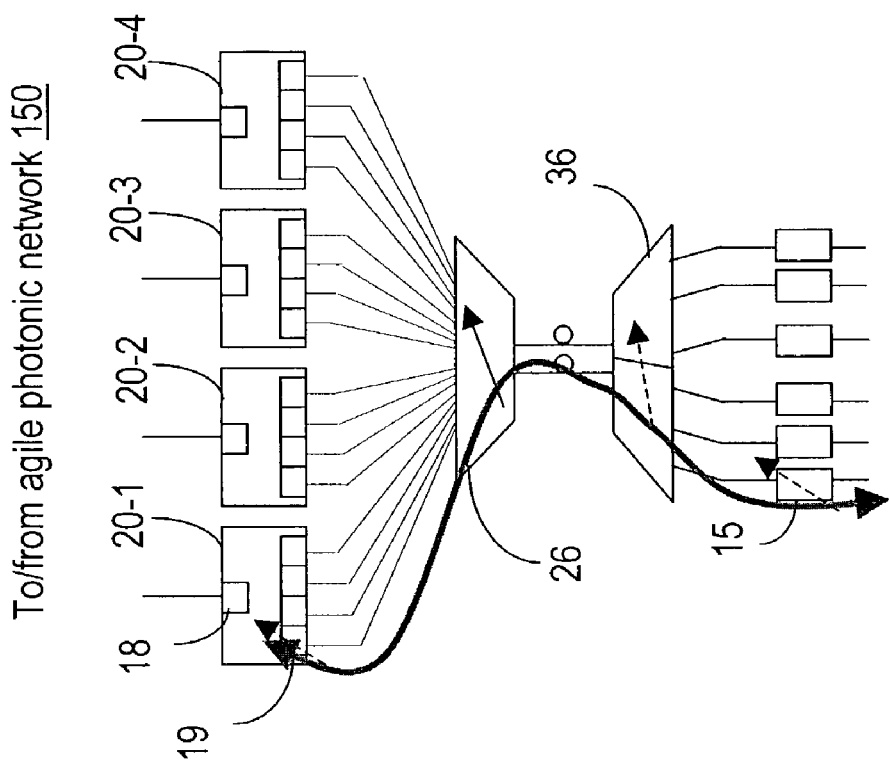
Figure 2B:
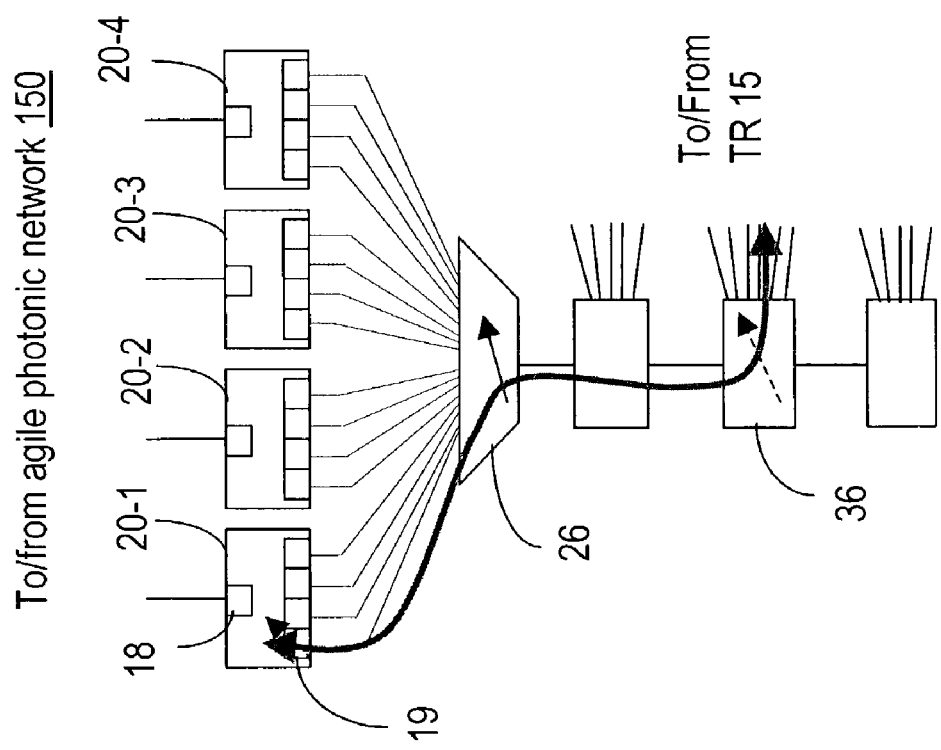

FIGS. 2B and 2C illustrate how the agile network 150 is aggregated with various types of metro networks, such as a linear network in FIG. 2B and a point-to-point network in FIG. 2C. It is to be noted that FIGS. 2A–2C do not show explicitly how agility of the inter-network connections is obtained, as this can be achieved in a plurality of ways, as described next; the arrows at the connection terminals indicate that the connection is agile and the switch at the hub node can be eliminated. In other words, the agility may be obtained using various agile configurations for device 26 at hub A, or/and devices 36 at the edge nodes, and/or tunable transmitters 24, 24'. Also, the connections over network 150 are not shown; of relevance here is that any node of network 150 may be connected to the hub in a flexible, agile manner. Details on the operation of network 150 are provided for example in the US patent application referenced above, U.S. patent application Ser. No. 09/876,391.

A cross-connect STS-XC 2 may also be used for managing conventional services, if for example switching/grooming at lower granularity (i.e. at STS-1 granularity) is necessary.

To summarize, the flexible metro connection is obtained by

Figure 3A:
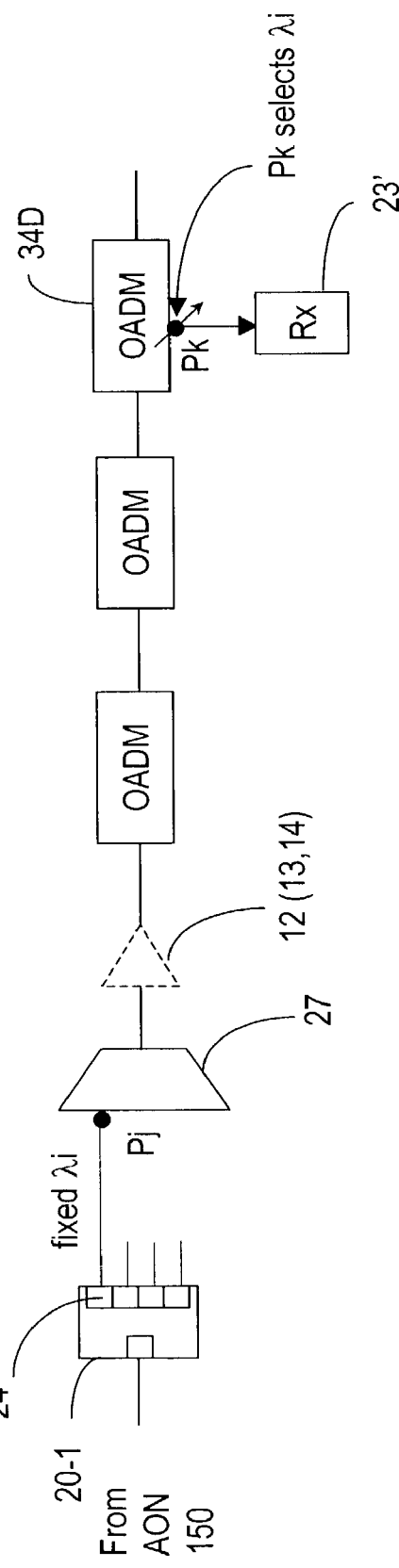
FIGS. 3A–3C illustrate a downstream path from the agile core network to the metro network, where the flexibility of wavelength assignment is obtained at the edge node in FIG. 3A, at the hub node in FIG. 3B and at both hub node and edge node in FIG. 3C.
Figure 3B:
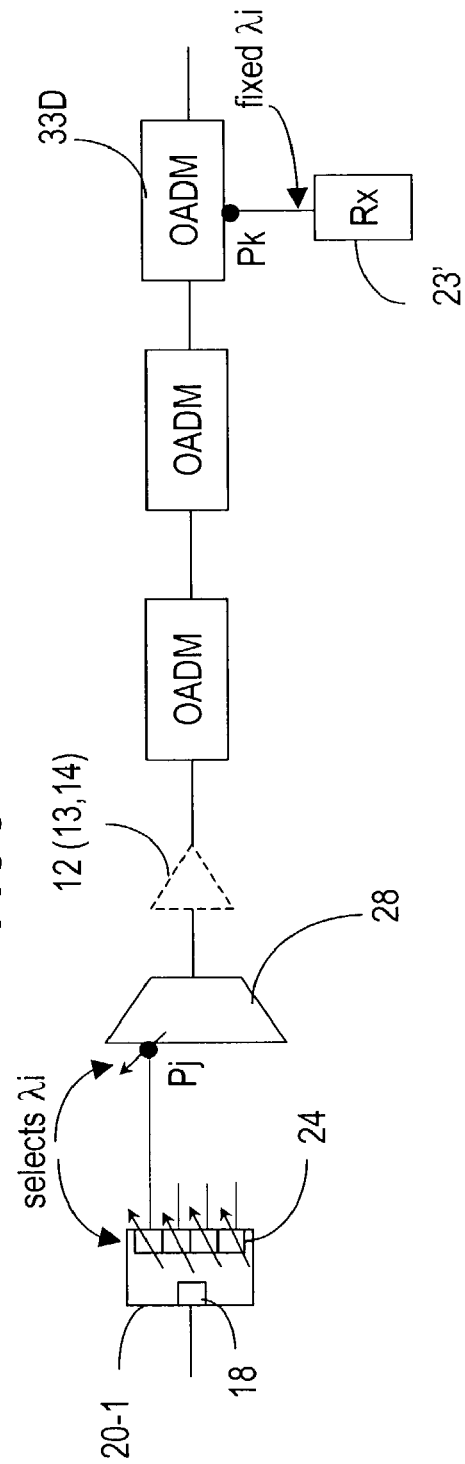
Figure 3C:
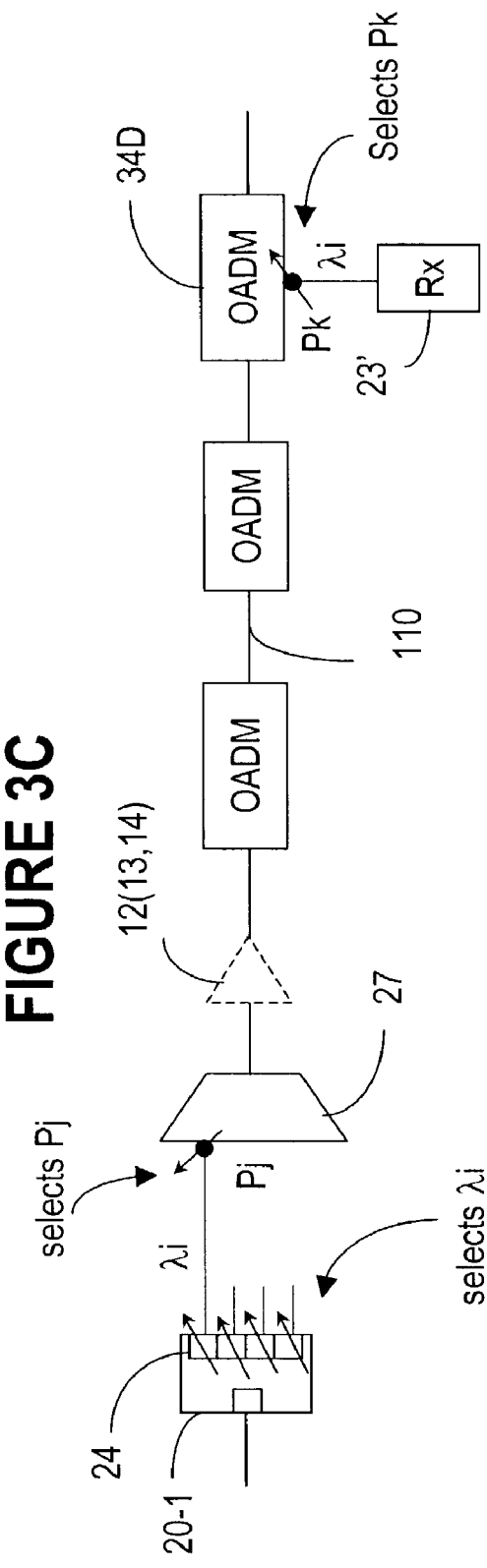

FIGS. 3A to 3C illustrate three variants of a downstream path; the term downstream is used for the direction of traffic from the agile network 150 to the metro network 100. In these examples, the flexibility of wavelength assignment is obtained at the edge node in FIG. 3A, at the hub node in FIG. 3B and at both hub node and edge node in FIG. 3C.

In FIG. 3A, the agile metro connection links a metro transmitter 24 at the hub node with a receiver 23' at an edge node, here node D. In this variant, the flexibility is provided at the edge; the head-end has a fixed wavelength allocation. Thus, the multiplexer 27 at hub A has a fixed port allocation, so that transmitter 24 is connected to a preset port Pj of the multiplexer 26; the black circle indicates that port Pj is static. The traffic travels on channel λi through intermediate nodes B and C of metro network 100, up to node D. The edge nodes comprises a flexible OADM 34D, where the drop port Pk has the ability to select channel λi based on the wavelength, and connect it to receiver 23'. The black circle with an arrow indicates that the respective port can be selected to connect any channel to the terminal (a receiver here) physically connected to it. In this way, the inter-network route shown in FIG. 3A connects a certain transmitter 24 with the edge receiver 23' on a metro channel of wavelength λi. The control unit 200 determines the wavelength of port Pj (i.e. λi), allocates wavelength λi to the metro channel, determines which drop port is physically connected to receiver 23' (i.e. Pk) and configures OADM 34D to route the metro channel on a port Pk.

FIG. 3B shows the same connection between transmitter 24 and receiver 23', where the flexibility is provided at the head-end. In this example, transmitter 24 is tunable, and also the port allocation on multiplexer 28 is flexible, as shown by the arrows on transmitter 24 and port Pj. The OADM 33 has a fixed port allocation of the drop ports (Pk is static). Specifically, each port of the OADMs 33 in the metro network 100 is pre-wired to a specific, different wavelength. Thus, controller 200 determines the wavelength of drop port Pk (i.e. λi) allocates to the metro channel the wavelength λi, and tunes the hub node to this wavelength λi.

FIG. 3C shows a metro connection where both the head-end and the tail-end are flexible. More precisely, transmitter 24 is tunable, and both input port Pj and drop port Pk can be selected by configuring the respective device 28, 34. Connection can be made at any wavelength, selected and tuned at both ends.

Figure 4A:
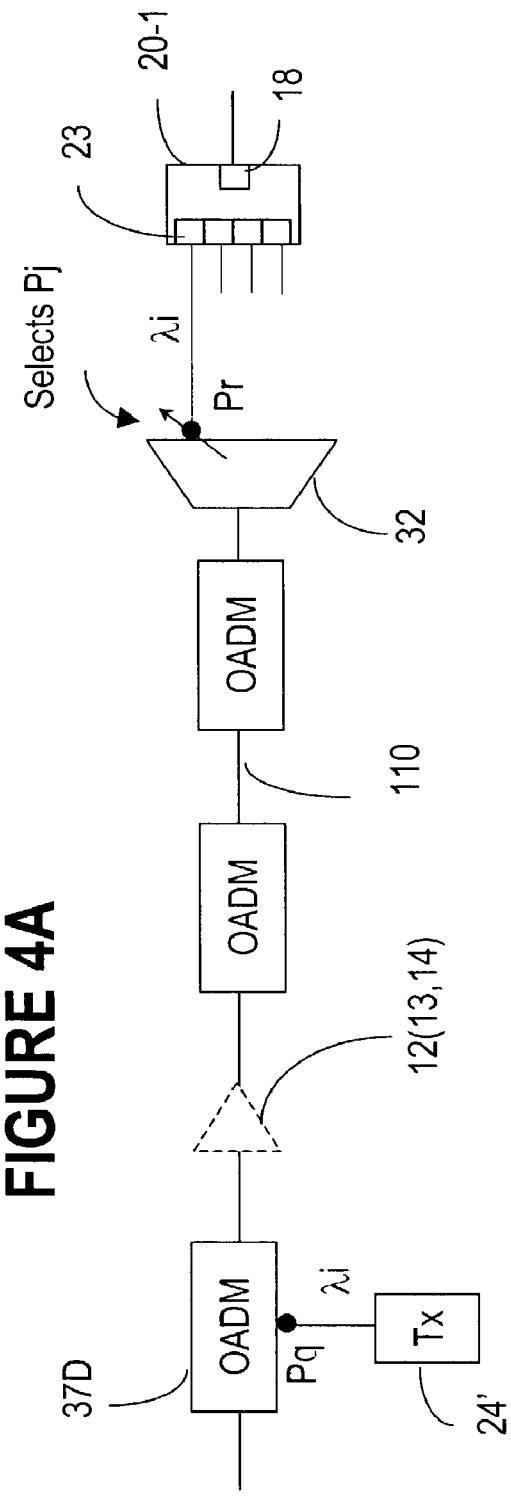
FIGS. 4A–4C illustrate an upstream path (from the metro network to the agile network) where the flexibility of wavelength assignment is obtained at the hub node in FIG. 4A, at the edge node in FIG. 4B and at both hub and edge node in FIG. 4C.
Figure 4B:
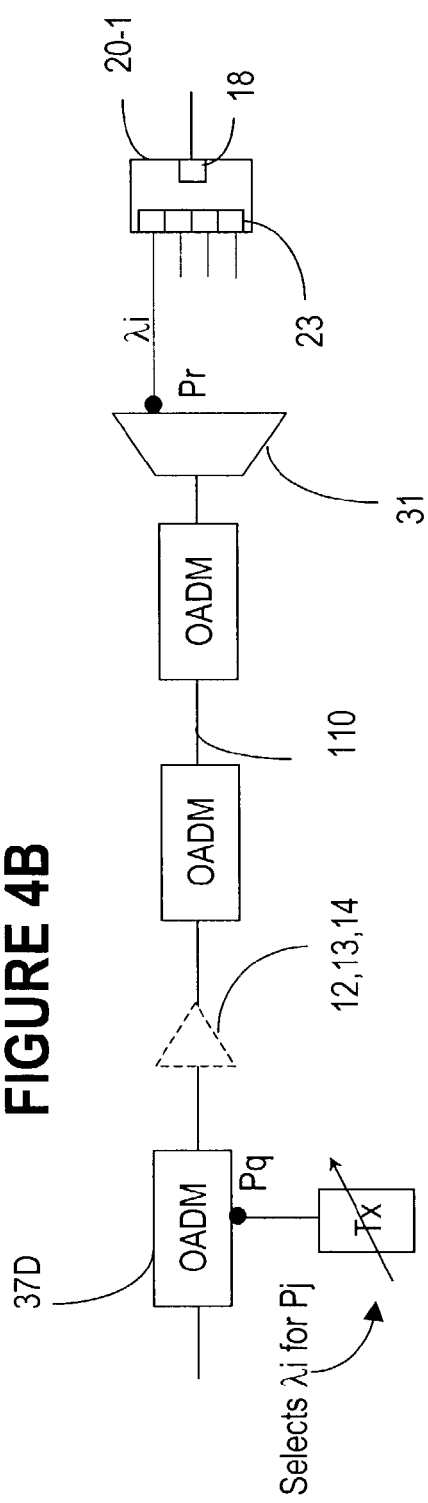
Figure 4C:
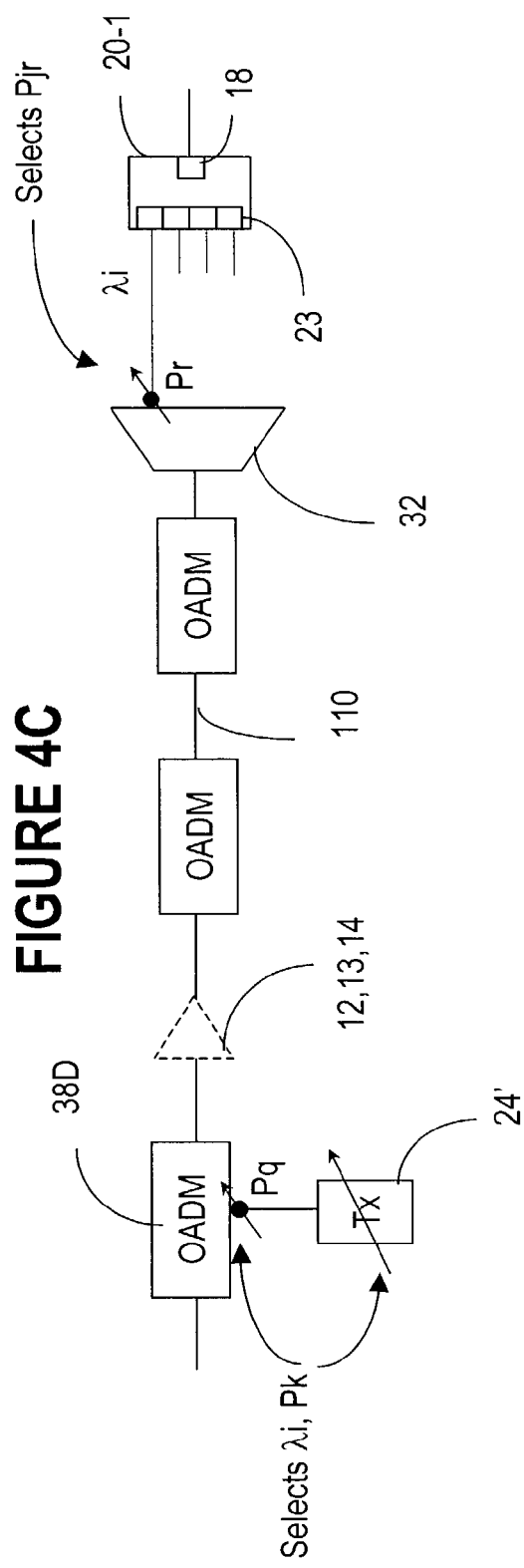

FIGS. 4A to 4C illustrate three variants of an upstream path; the term upstream is used for the direction of traffic from the metro network 100 to the agile network 150. In these examples, the flexibility of the connection is obtained at the hub node in FIG. 4A, at the edge node in FIG. 4B and at both the hub node and edge node in FIG. 4C.

In FIG. 4A, the source node, which is in this case the edge node D, has an OADM 37D with a fixed add port allocation. In other words, connection between the transmitter 24' and add port Pq is fixed on wavelength λi. At the hub, which is in this case the tail-end of the connection, the demultiplexer 32 has a flexible port allocation. In this example, controller 200 determines the wavelength of the add port Pq (i.e. λi), allocates to the metro channel this wavelength λi, determines which output port connects to the receiver 23 (i.e. Pr), and configures demultiplexer 32 so as to route the metro channel on port Pr.

Flexibility is obtained in the example of FIG. 4B using a tunable transmitter 24' at the edge node D and a fixed demultiplexer 31 at the hub node. Thus, the wavelength of output port Pr is selected as the wavelength of the metro channel and the head-end transmitter 24' is tuned accordingly.

FIG. 4C provides an example of an upstream metro connection where both the head-end and the tail-end are flexible. The wavelength λi selected for the metro connection can be tuned at the tunable transmitter 24'. In addition, both the OADM 38D and the demultiplexer 32 are flexible. In this case, any wavelength may be used for the metro connection. (The term "any wavelength" refers to the wavelengths available in metro network 100).

FIGS. 5A and 5B show tunability of wavelength allocation at the hub node, when the hub node is the head-end for the connection, as shown in FIGS. 3B and 3C. For example, the configuration of FIG. 5A is suitable for a smaller network, accommodating up to 50 metro channels. In this embodiment, the flexibility is obtained by using broadly tunable optical sources (lasers) at transmitters 24 and colorless multiplexers 27. The multiplexer 27 is a M-way coupler, that combines the output of the metro transmitters 24 into fiber 150. Wavelength allocation to the metro channel between the hub node and the edge node is selected by tuning the transmitter 24. A postamplifier 14 is also provided before the WDM signal is launched over the fiber towards the destination edge node.

FIG. 5B shows another configuration of a fixed multiplexer 27 with an add tree structure, where selection of the metro wavelengths is obtained by tuning transmitter 24. In this example, the metro channels generated by Q transmitters 24 are combined using a P:1 combiner 45-1. The grouped channels are further combined using an Q:1 combiner 45-2. An optical amplifier 50 and a blocker (which is a wavelength selective element) 55 are provided on the tree branches as shown. The optical amplifiers 55 are used for compensating for the losses in the fiber and in combiners 45-1, 45-2. Introduction of blockers 50 after amplification 55 also cuts off out-of-channel ASE (amplified spontaneous emission) from propagating over network 100. ASE is introduced by all optical amplifiers 55 in the signal path and is a broadband noise; the blockers attenuate this noise and also filter out the laser noise.

An optical postamplifier 14 is also used, as well known. In this example, since the cascaded combiners 45-1 and 45-2 allow combining 32×4=128 signals, the metro network 100 may route flexibly 128 wavelengths (in practice about 100).

This configuration is described in detail in the above identified U.S. patent application Ser. No. 09/946,576. Multiplexer 27 may also be configured with wavelength selective switches. Some embodiments are also shown in FIGS. 4A and 4B and described in the accompanying text of U.S. patent application Ser. No. 09/946,576.

FIG. 5C shows a flexible demultiplexer 32, where the hub node is the tail-end for the connection, as shown in FIGS. 4A and 4C. In this example, the metro WDM signal is first amplified by preamplifier 13, and divided into P power components by a 1:P splitter 45-1 (e.g. P=4). Each arm of this splitter is provided with a wavelength selective element, such as a blocker 55 which blocks the wavelengths that are not destined to any receiver at the end of the routes branching from that arm. Blockers 55 are preferably followed by an optical amplifier 55 is connected downstream from a blocker, for compensating for the losses in the blocker 55 and splitter 45-1. The output of the wavelength selective element is connected to a 1:Q splitter 45-2 (e.g. Q=8), the channels are then amplified by a second optical amplifier 50-2 and further broadcast along R routes by a 1:R splitter 45-3 (e.g. R=4), toward a broadband receiver 23 at terminal 15. A tunable wavelength filter 60 is provided on each arm of splitter 45-3, so that only the channel destined to a respective receiver 23 passes at the output port of demultiplexer 32.

Filter 40 is tuned so that it passes one channel only, which is the channel assigned to that output port, while blocking all other channels. In this way, a specific channel is selected and cleaned-up before it arrives at the receiver for decoding. In an alternate implementation, a tunable receiver may be used instead of tunable filter 40. This configuration allows flexible routing of 4×8×4=128 wavelengths (100 in practice), as described in the above identified U.S. patent application Ser. No. 09/876,391. Other embodiments using wavelength selective switches are also shown in FIGS. 3A and 3B of this co-pending application.

Figure 6A:
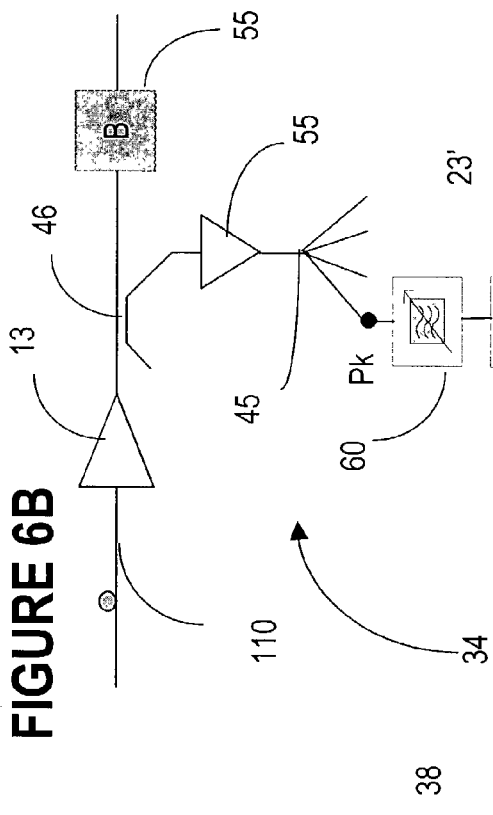
FIGS. 6A to 6D show various examples of port-wavelength tunability at the edge node.

FIGS. 6A to 6D show various examples of port-wavelength tunability at the edge node, i.e. flexible OADMs. In FIG. 6A the edge node is the head-end for the connection, as illustrated in FIGS. 4B and 4C. The metro channel, provided on a colorless port Pq of OADM 38, is combined with other channels by a Q:1 combiner 45 (e.g. M=4). The flexibility is obtained in this example by using tunable transmitters 24'. The passthrough channels are routed from the input port of the OADM to combiner 46, where they are combined with the add channels at the output of combiner 45. The drop channels are routed to a respective receiver using for example a drop tree as shown in the above-referenced U.S. patent application Ser. No. 10/002,773. A blocker 55 may be inserted in line 110 to prevent propagation of the dropped wavelength(s) along the line, so that these wavelengths may be reused. However, for a typical metro network, it is better (less expensive) to waste a wavelength than to make use of a blocker to enable reuse of that wavelength.

Other flexible configurations of the add side of the OADM are also possible. Thus, the blocker 55 can be replaced with a configurable OADM (COADM), as in U.S. patent application Ser. No. 10/002,773. As well, the add structure can be more complex for allowing larger number of add channels, as shown in above U.S. patent application Ser. No. 09/946,576, to further enhance the edge node flexibility by combining the tunability of the transmitter with provision of wavelength selective elements (blockers, switches) in the add tree.

Figure 6B:
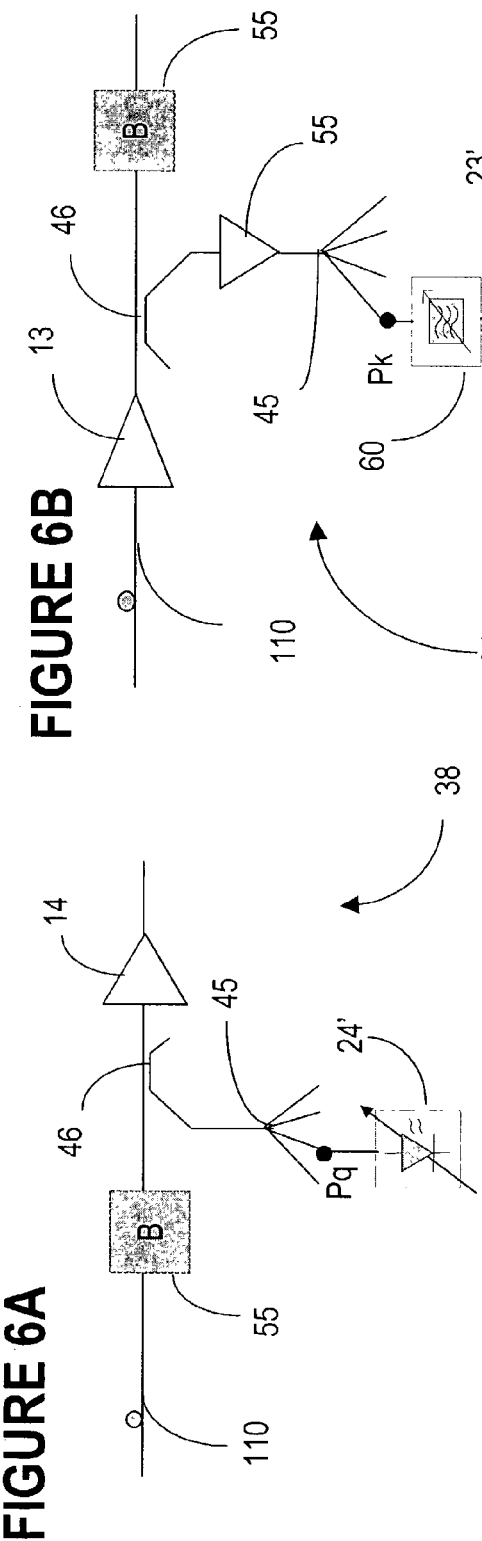
Figure 6C:
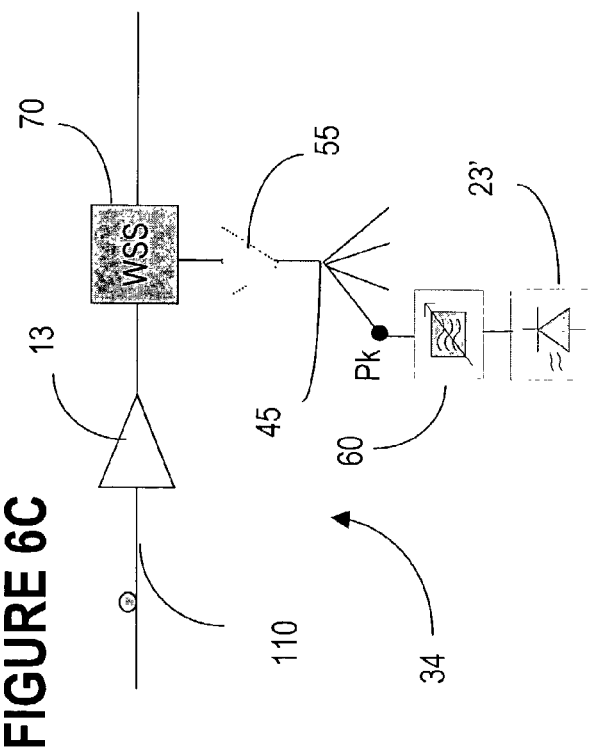
Figure 6D:
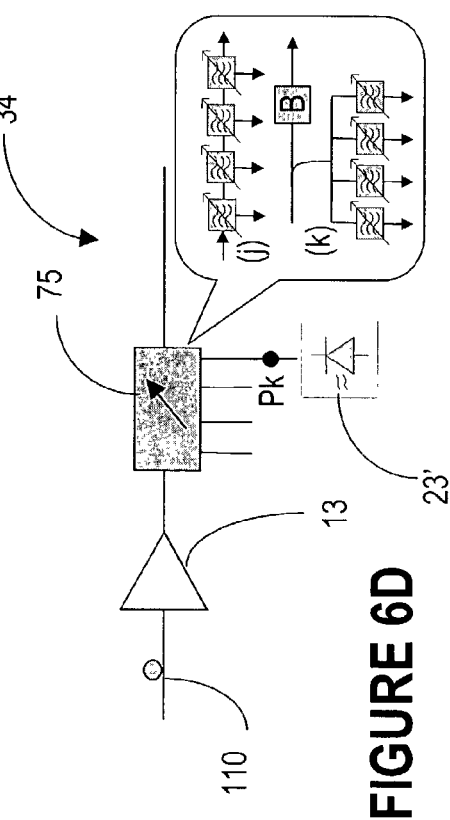

FIGS. 6B to 6D shows OADMs that provide flexibility on the drop side. In these cases, the edge node is the tail-end for the flexible metro connection, as illustrated in FIGS. 3A and 3C. The OADM of FIG. 6B separates the metro channel from the metro WDM signal on line 110 into two power components after amplification by preamplifier 13. A first component is directed to the drop structure, and the second one continues along line 110. As discussed in connection with FIG. 6A, a wavelength selective element, such as blocker 55 may be inserted in the line if there is an interest in reusing the drop wavelength(s). The drop component is split along M branches by a Q:1 splitter 45 (i.e. Q=4) and the metro channel of wavelength λi is selected along the branch leading to receiver 23' of choice, using a tunable filter 60 in front of the receiver. Other structures of the drop tree are also possible, as discussed above.

FIG. 6C shows a variant using a wavelength selective element 70 connected in the way of the input WDM signal. Device 70 could be for example a wavelength selective switch that separates the drop channels from the passthrough channels. The metro channel of wavelength λ1 is routed to the receiver of interest 23' by a splitter 45, and a tunable filter selects the channel before it arrives to the receiver.

FIG. 6D shows a configuration that uses wavelength selective element WSE 75. This WSE could, for example, be a switch, or a selective element made up of 3-port (in, out, drop) tunable filters as shown at (j), and (k). Again, variant (j) is preferred over variant (k) for a metro network (is less expensive).

We claim:

1. In a metro network subtended off an agile core network, a flexible metro connection for extending a flexible core connection over said metro network, comprising:
   an optical laser source terminal operating at a source wavelength for transmitting a user signal over a metro channel;
   a plurality of wavelength-dependent routes operating at a path wavelength, a route for directing said metro channel between an input port connected to said optical source and an output port connected to an associated optical destination terminal; and
   means for assigning a metro wavelength to said metro channel and routing said metro channel to a specified destination terminal based on said metro wavelengths, wherein any of said input port and output port is tunable to said metro wavelength.

2. A flexible metro connection as claimed in claim 1, wherein said optical source terminal is a tunable optical source, and wherein said means for assigning selects a path wavelength of a route to said specified destination terminal as said metro wavelength, and tunes said tunable optical source on said path wavelength.

3. A flexible metro connection as claimed in claim 1, wherein said wavelength-dependent routes are tunable, and wherein said means for assigning selects a source wavelength as said metro wavelength and tunes said route to said source wavelength.

4. A flexible metro connection as claimed in claim 3, wherein said route comprises a wavelength selective element for allowing said metro wavelength to pass from said optical source terminal to said specified destination terminal and to block all other wavelengths.

5. A flexible metro connection as claimed in claim 1, wherein said wavelength selective element is a wavelength selective switch.

6. In a metro network subtended of an agile core network, a method for extending an agile connection into said metro network, comprising:
   generating, at a head-end transmitter [and at least one of the tail end receivers], a metro channel carrying a user signal;
   connecting said head-end transmitter with a plurality of tail-end receivers along a respective plurality of wavelength-dependent routes provided over said metro network; and
   selecting a route between said head-end transmitter and a specified tail-end receiver and tuning said head-end transmitter to a metro wavelength corresponding to the wavelength of said route and said specified receiver.

7. In a metro network subtended off an agile core network, a method for extending an agile connection into a metro network, comprising:
   generating, at a head-end transmitter operating at a source wavelength, a metro channel for carrying a user signal;

providing a plurality of wavelength dependent routes over said metro network, a route for directing said metro channel between an input port connected to said head-end transmitter and an output port connected to an associated tail-end receiver over a path wavelength;

assigning a metro wavelength to said metro channel and routing said metro channel to a specified tail-end receiver based on said wavelength; and tuning any of said input port and output port to said metro wavelength.

8. A method as claimed in claim 7, wherein said step of assigning comprises selecting a path wavelength of a route to said specified destination terminal as said metro wavelength, and tuning said tunable head-end transmitter on said path.

9. A method as claimed in claim 7, wherein said step of assigning comprises selecting a source wavelength as said metro wavelength and tuning said route to said source wavelength.

10. A method as claimed in claim 7, wherein said tuning step comprises providing said route with a wavelength selective element for allowing said metro wavelength to pass from said head-end transmitter to said specified tail-end receiver and to block all other wavelengths.

11. A flexible metro connection for routing a user signal on a metro network between a hub node connecting said metro network to an agile core network and an edge node, comprising:

a hub node for transferring said user signal between a metro channel of a first wavelength and a core channel of a second wavelength;

an edge node for inserting/extracting said user signal into/from said metro channel; and a controller for tuning one of said hub node, edge node, and both said hub node and edge node to operate at said first wavelength.

12. A flexible metro connection as claimed in claim 11, wherein said edge node comprises:

an edge optical receiver for receiving said metro channel and detecting said user signal; and a flexible metro optical add/drop multiplexer OADM for routing said metro channel from a metro WDM signal to a drop port connected to said edge optical receiver, wherein said controller configures said flexible OADM to route said metro channel on said drop port.

13. A flexible metro connection as claimed in claim 12, wherein said OADM comprises:

means for directing a passthrough channel in said metro WDM signal from an line input port to an line output port; and a drop and select tree for routing said metro channel from said line input port to said drop port along a drop path tuned to said first wavelength.

14. A flexible metro connection as claimed in claim 13, wherein said drop and select tree comprises a plurality of branches, each branch including a wavelength selective element.

15. A flexible metro connection as claimed in claim 12, wherein said OADM comprises a wavelength selective switch for routing said metro channel to said drop port based on said first wavelength.

16. A flexible metro connection as claimed in claim 11, wherein said edge node comprises:

an OADM for routing said metro channel from an add port into a metro WDM signal; and a tunable edge optical transmitter for modulating said user signal over said first wavelength and providing said metro channel on said add port, wherein said controller selects said first wavelength for connecting said edge optical transmitter to a specified hub optical receiver over said metro channel.

17. A flexible metro connection as claimed in claim 16, wherein said add port is colorless.

18. A flexible metro connection as claimed in claim 16, wherein said OADM is a wavelength selective switch.

19. A flexible metro connection as claimed in claim 11, wherein said hub node comprises:

an optical multiplexer for receiving said metro channel on an input port and routing said metro channel into a metro WDM signal; and a tunable hub optical transmitter for modulating said user signal over said first wavelength to provide said metro channel on said input wherein said controller selects said first wavelength for connecting said hub optical transmitter to a specified edge optical receiver over said metro channel.

20. A flexible metro connection as claimed in claim 19, wherein said input port is colorless.

21. A flexible metro connection as claimed in claim 19, wherein said optical multiplexer comprises a wavelength selective element.

22. A flexible metro connection as claimed in claim 19, wherein said optical multiplexer is a wavelength selective switch.

23. A flexible metro connection as claimed in claim 19, wherein said hub node further comprises rate adaptation means, whenever said metro network operates at an R1 rate and said core network operates at an R2.

24. A flexible metro connection as claimed in claim 23, wherein said rate adaptation means comprises a R1×R2 mux/demux for demultiplexing said user signal from said core channel, and for multiplexing said user signal into said core channel.

25. A flexible metro connection as claimed in claim 24, wherein said rate adaptation means further comprises an OEO interface for connecting said rate adaptation means to said core network.

26. A flexible metro connection as claimed in claim 11, wherein said hub node comprises:

a flexible optical demultiplexer for routing said metro channel from an line input port to a drop port; and a hub optical receiver connected to said drop port for detecting said user signal from said metro channel, wherein said controller configures said flexible demultiplexer to route said metro channel on said drop port based on said first wavelength.

27. A flexible metro connection as claimed in claim 26, wherein said flexible optical demultiplexer comprises a drop and select tree for routing said metro channel from said line input port to said drop port along a drop path tuned to said first wavelength.

28. A flexible metro connection as claimed in claim 26, wherein said drop path comprises one of a wavelength selective element, a tunable filter and both.

29. A flexible metro connection as claimed in claim 26, wherein said flexible demultiplexer comprises a wavelength selective switch connected between said line input port and said drop port.

* * * * *